United States Patent [19]

Yabuki et al.

[11] Patent Number: 5,403,010
[45] Date of Patent: Apr. 4, 1995

[54] TWO-PIECE GOLF BALL

[75] Inventors: Yoshikazu Yabuki; Seiichiro Endo, both of Akashi, Japan

[73] Assignee: Sumitomo Rubber Industries, Ltd., Kobe, Japan

[21] Appl. No.: 157,330

[22] Filed: Nov. 26, 1993

[30] Foreign Application Priority Data

Nov. 26, 1992 [JP] Japan .................. 4-316848

[51] Int. Cl.⁶ .................................. A63B 37/12
[52] U.S. Cl. ......................... 273/220; 273/218
[58] Field of Search ............... 273/218, 220, 225, 228, 273/229, 230

[56] References Cited

U.S. PATENT DOCUMENTS

| | | | |
|---|---|---|---|
| 4,570,937 | 2/1986 | Yamada | 273/220 |
| 4,968,038 | 11/1990 | Yamada | 273/218 X |
| 5,002,281 | 3/1991 | Nakahara et al. | 273/218 X |
| 5,072,944 | 12/1991 | Nakahara et al. | 273/220 |

*Primary Examiner*—George J. Marlo

[57] ABSTRACT

A two-piece golf having a feel of hitting close to that of a thread-wrapped golf ball. A two-piece golf ball consisting of a core formed of a rubber composition containing a base rubber, a co-crosslinking agent, and an organic peroxide, and a cover covering the core, characterized in that:

the core has the following hardness distribution according to JIS - C type hardness meter readings:
(1) hardness at center, position A: 58-73
(2) hardness at 5 to 10 mm from center, position B: 65-75
(3) hardness at 15 mm from center, position C: 74-82
(4) surface hardness, position D: 76-84

(wherein hardness (2) is generally constant within the range shown, with a variation range of ±3, and satisfies the relation (1)<(2)<(3)≦(4) in other respects), and the core has a compression deflection of 3.5 to 4.3 mm when a load range of initial 10 kg to final 130 kg is applied, the cover having a thickness of 2.1 to 2.8 mm.

5 Claims, 1 Drawing Sheet

TWO-PIECE GOLF BALL

BACKGROUND OF THE INVENTION

1. Field of the Invention

The present invention relates to a two-piece golf ball and, more particularly, to a two-piece golf ball having a good feel of hitting when the ball is hit.

2. Description of the Prior Art

Two-piece golf balls are widely accepted for use because of their good flight characteristics. However, with such a ball, the problem is that it has a harder feel of hitting as compared with a thread wound golf ball; especially when the ball is misshot, such feeling is far much greater. As such, there exists a demand for a two-piece golf ball having a good feel of hitting.

Recently, various efforts have been made to provide a feel of ball hitting closer to that of a thread-wound golf ball. For example, an attempt has been made to arrange that the core of a two-piece golf ball is made softer to moderate the hardness of the ball as a whole, thereby to provide an improved feel of ball hitting. However, any golf ball produced on the basis of such an idea lacks the concept of core hardness distribution and feels heavy though it has some soft feel. Indeed, such a ball can hardly be said as having a feel close to that of a thread-wound golf ball.

SUMMARY OF THE INVENTION

The present invention is directed to controlling the core characteristics and cover thickness with respect to a two-piece golf ball thereby to provide a two-piece golf ball having a feel of ball hitting closer to that of a thread-wound golf ball.

The present inventors conducted a series of research on two-piece golf balls, with particular attention directed to such factors as core hardness distribution, compressive strength, and cover thickness. As a result, the inventors found that by designing the core so that it has a hardness profile such that it is harder at the outer position and softer at the inner position, adjusting the compressive strength of the core accordingly, and sizing the cover to a thickness of 2.1 to 2.8 mm, thus optimizing both the hardness distribution of the core and the thickness of the cover, it would be possible to provide a two-piece golf ball having a cover free of hard feel and a core feeling light and moderately soft, so that the ball feels soft and light, has a good feel of ball hitting, and can produce a greater carry than any conventional two-piece golf ball can produce.

Thus, according to the invention, there is provided a two-piece golf ball consisting of a core 1 formed of a rubber composition containing a base rubber, a co-crosslinking agent, and an organic peroxide, and a cover 2 covering the core, characterized in that:

the core has the following hardness distribution according to JIS - C type hardness meter readings:
(1) hardness at center, position A: 58–73
(2) hardness at 5 to 10 mm from center, position B: 65–75
(3) hardness at 15 mm from center, position C: 74–82
(4) surface hardness, position D: 76–84

(wherein hardness (2) is generally constant within the range shown, with a variation range of ±3, and satisfies the relation (1)<(2)<(3)≦(4) is satisfied), and the core has a compression deflection of 3.5 to 4.3 mm when a load range of initial 10 kg to final 130 kg is applied, the cover having a thickness of 2.1 to 2.8 mm.

The base rubber used in the invention may be any natural rubber and/or synthetic rubber which has been conventionally used in two-piece cores. In particular, a cis-1, 4-polybutadiene rubber having at least 40% of a cis structure is preferred and, if necessary, the polybutadiene rubber may be suitably mixed with natural rubber, polyisoprene rubber, styrene-butadiene rubber, EPDM or the like.

The co-crosslinking agent is not particularly limited, and may be, for example, a metal salt of an unsaturated carboxylic acid, more particularly, a monovalent or bivalent metal salt of such an acid having 3 to 8 carbon atoms (e. g., acrylic acid or methacrylic acid). Zinc acrylate is especially preferred. The proportion of the co-crosslinking agent is 20 to 35 parts by weight, preferably 20 to 30 parts by weight, relative to 100 parts by weight of the base rubber. If the proportion is less than 20 parts by weight, the hardness of the ball is insufficient, which results in heavy and unsatisfactory feel and poor durability. If the proportion exceeds 35 parts by weight, the ball is excessively hard to produce a poor feel.

The organic peroxide can be any one that is used in this field, but includes, dicumyl peroxide and di-t-butyl peroxide. Dicumyl peroxide is especially preferred. The proportion of the organic peroxide is 0.5 to 5.0 parts by weight, preferably 1.0 to 3.0 parts by weight, relative to 100 parts by weight of the base rubber. If the proportion is less than 0.5 parts by weight, the hardness of the ball is insufficient, which results in an heavy and unsatisfactory feel. If the proportion is greater than 5.0 parts by weight, the ball is excessively hard to produce a poor feel.

The rubber composition used in the golf ball of the invention may be admixed with such additives as fillers and anti-oxidizing agent, if necessary. Examples of the fillers generally include zinc oxide, barium sulfate and the like. The proportion of such additives is dependent on the specific gravity and size of the cover and core and not particularly limited, but is generally 10 to 40 parts by weight relative to 100 parts by weight of the base rubber.

The rubber composition is thoroughly kneaded, and vulcanized and molded in a mold, whereby a core of a two-piece golf ball is formed. Conditions for kneading and vulcanizing are well known to persons skilled in the art. For example, vulcanizing operation is generally carried out at temperatures of 140° to 180° C. for a period of 15 to 55 minutes.

The core of the golf ball of the invention has a hardness distribution which preferably meets the following conditions: (1) hardness at core center is 58 to 73, (2) hardness at 5 to 10 mm from center is 65 to 75, (3) hardness at 15 mm from center is 74 to 82, and (4) surface hardness is 76 to 84, according to JIS-C type hardness meter readings. The hardness distribution also satisfies the relation of (1)<(2)<(3)≦(4). In particular, hardness (2) involves no hardness dispersion and is generally constant, with a variation range of not more than ±3. An approach which specifies a hardness distribution in such a way is described in Japanese Patent Application Laid-Open No. 60-90575.

Where the hardness profile is lower than the above noted range, the ball has poor durability and feels excessively soft and heavier. Where the hardness profile is higher than the above noted range, the ball is subject to stronger impact force when hit and feels poor. Where the hardness distribution is higher toward the core surface, the ball is subject to stronger impact force and lacks soft feeling. Where the hardness profile includes a flat region as in the present invention, the ball is subject to smaller impact force and has a good soft feel.

When the core is subjected to a load range of initial 10 kg to final 130 kg, it is necessary that the ball should have a compression deflection of 3.5 to 4.3 mm. Such compression deflection may be controlled mainly by adjusting the proportion of the metal salt of unsaturated carboxylic acid. It is also possible to control such compression deflection by adjusting the proportion of other chemical and the vulcanizing conditions. Whichever method may be employed for such control, if the deflection of the core is greater than 4.3 mm, the ball has a lower rebound coefficient and unsatisfactory flight performance. Basically, in such a case, the ball feels excessively soft, heavier and rather dull, and is less durable. Conversely, where the core deflection is smaller than 3.5 mm, the ball feels harder and unsatisfactory.

The golf-ball core thus obtained is covered with a 2.1 to 2.8 mm thick cover to provide a two-piece golf ball. Usually, for the cover is used a member comprised mainly of an ionomer resin, with a filler (e.g., titanium dioxide, barium sulfate, or the like) contained therein for coloration purposes as required. Where the cover is less than 2.1 mm in thickness, the ball is subject to excessive spin so that the ball is unsatisfactory in its flight performance; further, the ball feels too soft and rather dull, which means that the ball has a feel close to that of a one-piece ball. Where the thickness of the cover is more than 2.8 mm, the ball feels harder and heavier to produce unsatisfactory feeling.

According to the invention, the flexural rigidity of the cover is preferably set in a range of 3000 to 4500 kg/cm$^2$. Where the flexural rigidity is smaller than 3000 kg/cm$^2$, the cover is relatively soft and, therefore, the ball feels softer, heavier and rather dull. Conversely, the flexural rigidity is greater than 4500 kg/cm$^2$, the ball feels harder and heavier.

The method of forming a cover from ionomer resin is known in the art, which method is usually carried out by using an injection molding technique.

DETAILED DESCRIPTION OF THE PREFERRED EMBODIMENTS

EXAMPLES

Figure 1:
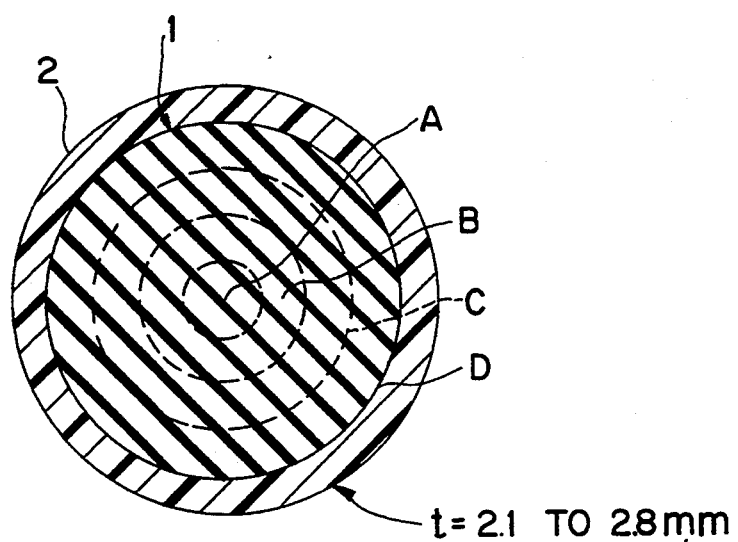
FIG. 1 shows the two-piece golf ball of the invention with the locations of the JIS-C hardness values of the core portions and the cover thickness t.

Consequently, examples are given to illustrate the invention in further details. It is understood that the invention is not limited by these examples.

Examples 1–6 and Comparison Examples 1–4

Core ingredients shown in Table 1 were mixed and kneaded to obtain rubber compositions. Each of the rubber compositions was vulcanized and molded in a mold under the conditions shown in Table 1. The hardness distribution and compressive strength of each core obtained is shown in Table 1.

Covers formed from ingredients shown in Table 1 and according to the normal procedure were used to cover the respective cores. The flexural rigidity and thickness of each cover is shown in Table 1.

Various features of the two-piece golf balls obtained, including hardness (PAG number), durability index, rebound coefficient, flying characteristics, such as hitting angle, spin, and carry, and feel evaluation, are shown in Table 2.

TABLE 1

|  |  | Example |  |  |  |  |  |
|---|---|---|---|---|---|---|---|
|  |  | 1 | 2 | 3 | 4 | 5 | 6 |
| Core |  |  |  |  |  |  |  |
| Composition | BR-01 | 100 | 100 | 100 | 100 | 100 | 100 |
|  | Zinc acrylate | 22 | 25 | 28 | 22 | 25 | 28 |
|  | Zinc oxide | 24.0 | 22.5 | 21.5 | 25.5 | 24 | 23 |
|  | Anti-aging agent | 0.5 | 0.5 | 0.5 | 0.5 | 0.5 | 0.5 |
|  | Dicumyl peroxide | 2.5 | 2.0 | 1.5 | 2.0 | 1.5 | 1.0 |
| Vulcanizing conditions | Temp. × Time | 162° C. × 23 min | 162° C. × 23 min | 162° C. × 23 min | 165° C. × 20 min | 165° C. × 20 min | 165° C. × 20 min |
| Hardness distribution | Center | 62 | 64 | 65 | 61 | 63 | 64 |
|  | 5 mm from center | 70 | 71 | 72 | 70 | 70 | 71 |
|  | 10 mm from center | 70 | 71 | 72 | 70 | 70 | 71 |
|  | 15 mm from center | 75 | 76 | 77 | 76 | 75 | 75 |
|  | Surface | 79 | 78 | 78 | 79 | 77 | 77 |
| Compression strength | (mm) | 3.83 | 3.8 | 3.75 | 4.02 | 4.0 | 3.96 |
| Cover |  |  |  |  |  |  |  |
| Composition[1] | Himillan 1706 | 50 | 50 | 50 | 50 | 50 | 50 |
|  | Himillan 1605 | 50 | 50 | 50 | 50 | 50 | 50 |
| Flexual rigidity[2] | 23° C. × 2 weeks | 3300 | 3300 | 3300 | 3300 | 3300 | 3300 |
| Cover thickness | (mm) | 2.3 | 2.3 | 2.3 | 2.6 | 2.6 | 2.6 |

|  |  |  | Comparison Example |  |  |  |
|---|---|---|---|---|---|---|
|  |  |  | 1 | 2 | 3 | 4 |
| Core |  |  |  |  |  |  |
| Composition | BR-01 |  | 100 | 100 | 100 | 100 |
|  | Zinc abrylate |  | 18 | 25 | 28 | 28 |
|  | Zinc oxide |  | 25.5 | 22.5 | 19 | 26.5 |
|  | Anti-aging agent |  | 0.5 | 0.5 | 0.5 | 0.5 |
|  | Dicumyl peroxide |  | 2.8 | 2.0 | 1.5 | 1.0 |
| Vulcanizing | Temp. × Time |  | 165° C. × | 150° C. × | 165° C. × | 165° C. × |

TABLE 1-continued

|  |  | 20 min | 35 min | 20 min | 20 min |
|---|---|---|---|---|---|
| Hardness distribution | Center | 53 | 67 | 62 | 65 |
|  | 5 mm from center | 70 | 72 | 71 | 72 |
|  | 10 mm from center | 70 | 76 | 71 | 72 |
|  | 15 mm from center | 75 | 78 | 76 | 75 |
|  | Surface | 79 | 75 | 78 | 77 |
| Compression strength | (mm) | 4.6 | 3.35 | 3.7 | 4.2 |
| Cover |  |  |  |  |  |
| Composition[1] | Himillan 1706 | 50 | 50 | 50 | 50 |
|  | Himillan 1605 | 50 | 50 | 50 | 50 |
| Flexural rigidity[2] | 23° C. × 2 weeks | 3300 | 3300 | 3300 | 3300 |
| Cover thickness | (mm) | 2.3 | 2.3 | 1.9 | 3.0 |

BR-01: Butadiene rubber available from Japan Synthetic Rubber Co., Ltd.(cis 1,4 content = 96%)
Anti-aging agent: Yoshinox 425 available from Yoshitomi Pharmaceutical Industries, Ltd.
[1] Two parts by weight of titanium oxide (TiO$_2$) were added to 100 parts by weight of ionomer resin, and the mixture was extruded by an extruder while being subjected to coloring. Thus, a cover composition was prepared.
[2] Flexural rigidity: Measurement was made by a stiffness tester made by Toyo Seiki K.K. Each measurement sample was formed into a flat plate by press molding. After being so pressed, the plate was allowed to stand for two weeks at a temperature of 23° C. and a humidity of 50%, before measurement was made.

TABLE 2

|  |  | Example |  |  |  |  |  |
|---|---|---|---|---|---|---|---|
|  |  | 1 | 2 | 3 | 4 | 5 | 6 |
| Ball evaluation |  |  |  |  |  |  |  |
| Hardness (PAG number) |  | 88 | 89 | 91 | 90 | 91 | 92 |
| Durability index[1] |  | 100 | 103 | 105 | 105 | 107 | 110 |
| Rebound coefficient (45 m/s) |  | 0.7805 | 0.7800 | 0.7798 | 0.7797 | 0.7795 | 0.7792 |
| Flying characteristics | Hit angle (°) | 12 | 12 | 11.9 | 12.2 | 12.2 | 12.1 |
|  | Spin (rpm) | 2500 | 2500 | 2510 | 2470 | 2480 | 2480 |
|  | Carry (yard) | 235 | 235 | 235 | 234.5 | 234.5 | 234.5 |
| Feel evaluation |  | Light, soft, good ○ | Light, soft, good ○ | Light, soft, good ○ | Light, soft, good ○ | Light, soft, good ○ | Light, soft, good ○ |

|  |  | Comparison Example |  |  |  |
|---|---|---|---|---|---|
|  |  | 1 | 2 | 3 | 4 |
| Ball evaluation |  |  |  |  |  |
| Hardness (PAG number) |  | 74 | 97 | 87 | 94 |
| Durability index[1] |  | 65 | 130 | 70 | 115 |
| Rebound coefficient (45 m/s) |  | 0.7750 | 0.7820 | 0.7790 | 0.7755 |
| Flying characteristics | Hit angle (°) | 12.8 | 10.5 | 10.2 | 11.8 |
|  | Spin (rpm) | 2300 | 2700 | 2700 | 2520 |
|  | Carry (yard) | 231 | 234 | 233 | 231 |
| Feel evaluation |  | Too soft, heavy, dull Δ~X | Hard X | Too soft, heavy, rather dull Δ~X | Rather hard, heavy, less repulsive Δ |

[1] Durability index: expressed on the basis of the number of times of impact applied = 100. The number of times of impact applied represents the number of times the ball was hit by a golf-ball hitting tester (a swing robot made by True Temper) until breakage.
[2] 45 m/s W1 flight (flying characteristics): a value measured with the ball when the ball was tested by being hit with W1 (wood No. 1 club) at 45 m/s by employing the above noted golf-ball hitting tester.

As is apparent from Table 1 and Table 2 measurement results, balls of Examples 1 to 6 are light and soft and have such good feel as is close to a thread-wrapped ball. They are also found satisfactory in durability and flying characteristics.

The ball of Comparison Example 1 is inferior in core compressive strength (4.6 mm), is low in ball hardness, and is too soft and heavy, thus giving a dull and unfavorable feel. The ball is also inferior in durability.

The ball of Comparison Example 2 has a low core compressive strength (3.35 mm), higher ball hardness, and has a hard and unfavorable feel.

The ball of Comparison Example 3 has a thin cover giving a feel close to that of a one-piece ball; it feels soft and heavy. The ball is more subject to spin and is inferior in flight and durability characteristics.

The ball of Comparison Example 4 is rather hard and heavy because of its thick cover, and has an unfavorable feel.

The two-piece golf ball of the invention has a feel of hitting which is close to that of a thread-wrapped golf ball. In addition, the ball has good flight characteristics inherent to a two-piece golf ball. Thus, the golf ball of the invention has a good advantage in both flying characteristics and feel of hitting.

What is claimed is:

1. A two-piece golf ball comprising a core formed of a rubber composition containing a base rubber, a co-crosslinking agent, and an organic peroxide, and a cover covering said core, characterized in that:
   the core has the following hardness distribution according to JIS - C type hardness meter readings:
   (1) hardness at center: 58–73

(2) hardness at 5 to 10 mm from center: 65–75
(3) hardness at 15 mm from center: 74–82
(4) surface hardness: 76–84 wherein hardness (2) is generally constant within the range shown, with a variation range of ±3, and the relation (1)<(2)<(3)≦(4) is satisfied, and said core has a compression deflection of 3.5 to 4.3 mm when a load range of initial 10 kg to final 130 kg is applied, the cover having a thickness of 2.1 to 2.8 mm.

2. The two-piece golf ball according to claim 1 wherein said rubber composition for making the core comprises cis-1,4-polybutadiene, zinc (meth) acrylate and dicumyl peroxide, zinc (meth) acrylate being present in an amount of 20 to 35 parts by weight and dicumyl peroxide being present in an amount of 0.5–5.0 parts by weight, based on 100 parts by weight of cis-1,4-polybutadiene.

3. The two-piece golf ball according to claim 2 wherein said rubber composition further comprises a filler and an anti-oxidizing agent.

4. The two-piece golf ball according to claim 1 wherein said cover is made of ionomer resin.

5. The two-piece golf ball according to claim 1 wherein said cover has a flexural rigidity of 3000 to 4500 Kg/cm².

* * * * *